(12) United States Patent
Hoz

(10) Patent No.: US 10,994,245 B2
(45) Date of Patent: *May 4, 2021

(54) METHOD AND SYSTEM FOR LIQUID TREATMENT

(71) Applicant: ISRAEL AEROSPACE INDUSTRIES LTD., Lod (IL)

(72) Inventor: Benaya Hoz, Petah-Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/330,720

(22) PCT Filed: Aug. 9, 2017

(86) PCT No.: PCT/IL2017/050879
§ 371 (c)(1),
(2) Date: Mar. 5, 2019

(87) PCT Pub. No.: WO2018/047156
PCT Pub. Date: Mar. 15, 2018

(65) Prior Publication Data
US 2019/0209968 A1    Jul. 11, 2019

(30) Foreign Application Priority Data

Sep. 7, 2016   (IL) .......................................... 247687

(51) Int. Cl.
*B01D 61/12*      (2006.01)
*C02F 1/44*       (2006.01)
(Continued)

(52) U.S. Cl.
CPC .............. *B01D 61/12* (2013.01); *C02F 1/008* (2013.01); *C02F 1/441* (2013.01); *B01D 65/08* (2013.01);
(Continued)

(58) Field of Classification Search
CPC ...... B01D 61/12; C02F 1/441; C02F 2209/03; C02F 2209/05; C02F 2209/40
See application file for complete search history.

(56) References Cited

U.S. PATENT DOCUMENTS 7,628,921 B2   12/2009   Efraty
7,695,614 B2    4/2010   Efraty
(Continued)

FOREIGN PATENT DOCUMENTS

WO   2013147702 A1   10/2013

OTHER PUBLICATIONS

International Search Report and Written Opinion from International Application No. PCT/IL2014/050879 dated Nov. 22, 2017.

*Primary Examiner* — Bradley R Spies
(74) *Attorney, Agent, or Firm* — Dorsey & Whitney LLP

(57) ABSTRACT

A method of treatment of liquid in a liquid treatment system comprising: at least one liquid treatment module including at least one membrane and having a feed liquid inlet at a feed side of said at least one membrane, a permeate outlet at a permeate side of said at least one membrane, and a concentrate outlet at a brine side of said at least one membrane; a high pressure pump operative for pressurizing feed liquid to be received at said feed liquid inlet; and a system controller for controlling operation of the system including providing instructions to operate said high pressure pump in one of at least two operation modes including: a first mode in which the high pressure pump maintains a fixed flow rate of the feed liquid at said feed liquid inlet or of a permeate liquid at said permeate outlet, while energy consumption of said high pressure pump being a function of variations of a first operational parameter measured in the system and indicative of salinity of liquid within said at least one liquid treatment module, and a second mode in which the high pressure pump maintains a flow rate of the feed liquid at said feed liquid (Continued)

inlet or of a permeate liquid at said permeate outlet, while energy consumption of said high pressure pump being a function of a second operational parameter determined so as to reduce energy consumption of the high pressure pump; said method being performed under control of said system controller and comprising steps of: pressurizing feed liquid by said high pressure pump in said first mode; circulating a concentrate from said concentrate outlet to said feed liquid inlet; providing to said system controller a third operational parameter measured in the system and indicative of salinity of liquid within said liquid treatment module; and upon detecting that a predetermined first threshold of said third operational parameter is reached, operating said high pressure pump in said second mode.

20 Claims, 11 Drawing Sheets

(51) Int. Cl.
*C02F 103/08* (2006.01)
*C02F 1/00* (2006.01)
*B01D 65/08* (2006.01)

(52) U.S. Cl.
CPC ...... *B01D 2311/25* (2013.01); *C02F 2103/08* (2013.01); *C02F 2209/005* (2013.01); *C02F 2209/006* (2013.01); *C02F 2209/008* (2013.01); *C02F 2209/03* (2013.01); *C02F 2209/05* (2013.01); *C02F 2209/40* (2013.01)

(56) References Cited

U.S. PATENT DOCUMENTS

| | | |
|---|---|---|
| 8,025,804 B2 | 9/2011 | Efraty |
| 2006/0254981 A1 | 11/2006 | Efraty |
| 2007/0295650 A1 | 12/2007 | Yoneda et al. |
| 2008/0217222 A1 | 9/2008 | Efraty |
| 2013/0126430 A1 | 5/2013 | Kenley et al. |
| 2014/0061129 A1* | 3/2014 | Hoz .................. C02F 1/441 210/636 |
| 2016/0038880 A1* | 2/2016 | Benton .............. B01D 61/027 210/641 |
| 2016/0257576 A1 | 9/2016 | Hoz |

* cited by examiner

METHOD AND SYSTEM FOR LIQUID TREATMENT

TECHNOLOGICAL FIELD

The present application is directed to systems and methods of liquid treatment, in particular, liquid desalination.

BACKGROUND

Desalination processes and/or treatment processes are well known in the art, and are configured for receiving feed liquid and, following proper treatment, to produce a first stream of 'product' liquid (e.g., fresh water) also known as permeate, and a second stream of brine (e.g., highly saline water).

Different systems and methods were devised in order to increase the efficiency of such treatment processes, including more sophisticated membranes and liquid recirculation arrangements. Some examples of prior publications are U.S. Pat. Nos. 7,628,921, 7,695,614, US 2008/217222 and U.S. Pat. No. 8,025,804.

GENERAL DESCRIPTION

According to a first aspect of the presently disclosed subject matter, there is provided a method of treatment of liquid in a liquid treatment system comprising: at least one liquid treatment module including at least one membrane and having a feed liquid inlet at a feed side of the at least one membrane, a permeate outlet at a permeate side of the at least one membrane, and a concentrate outlet at a brine side of the at least one membrane; a high pressure pump operative for pressurizing feed liquid to be received at the feed liquid inlet; and a system controller for controlling operation of the system including providing instructions to operate the high pressure pump in one of at least two operation modes including: a first mode in which the high pressure pump maintains a fixed flow rate of the feed liquid at said feed liquid inlet or of a permeate liquid at the permeate outlet, while energy consumption of the high pressure pump being a function of variations in salinity of liquid within said at least one liquid treatment module, and a second mode in which the high pressure pump maintains a flow rate of the feed liquid or of a permeate liquid at the permeate outlet, while energy consumption of the high pressure pump being reduced; the method being performed under control of the system controller and comprising steps of:

pressurizing feed liquid by the high pressure pump in the first mode;

circulating a concentrate from said concentrate outlet to said feed liquid inlet;

providing to the system controller an indication of salinity of liquid within said liquid treatment module; and upon detecting that a predetermined indication of said salinity is reached, operating the high pressure pump in the second mode.

According to a second aspect of the presently disclosed subject matter, there is provided a liquid treatment system comprising:

at least one liquid treatment module including at least one membrane and having a feed liquid inlet at a feed side of the at least one membrane, a permeate outlet at a permeate side of the at least one membrane, and a concentrate outlet at a brine side of the at least one membrane;

a high pressure pump operative for pressurizing feed liquid to be received at the feed liquid inlet; and a system controller configured for controlling operation of the system by:

providing instructions to operate the high pressure pump for pressurizing the feed liquid in a first mode in which the high pressure pump maintains a fixed flow rate of the feed liquid or of a permeate liquid at the permeate outlet, while energy consumption of the high pressure pump being a function of variations in salinity of liquid within said at least one liquid treatment module;

providing instructions to circulate a concentrate from said concentrate outlet to said feed liquid inlet;

receiving indication of salinity of liquid within said liquid treatment module; and upon detecting that a predetermined indication of said salinity is reached, providing instructions to operate the high pressure pump in a second mode in which the high pressure pump maintains a flow rate of the feed liquid or of a permeate liquid at the permeate outlet, while energy consumption of the high pressure pump being reduced.

The feed liquid to be treated by the method and the system of presently disclosed subject matter may be, for example, saline solution, sea water, brackish water and waste water, or any combination thereof.

The energy consumption of the high pressure pump in the first mode can be a function of variations of a first operational parameter measured in the system and indicative of the salinity of the liquid within said at least one liquid treatment module.

The first operational parameter can be at least one of the following measurable parameters:

flow rate of the feed liquid;
conductivity of the concentrate;
pressure of the concentrate with or without said feed liquid;
information regarding accumulation of foulants on the at least one membrane element; and
a predetermined time schedule.

The energy consumption of the high pressure pump in the second mode can be reduced by determining it as a function of a second operational parameter.

The second operational parameter can be at least one of the following:

a predetermined value of an operational frequency to the high pressure pump;
a predetermined value of flow rate which is lower than the fixed flow rate of the feed liquid; and
a predetermined value of flow rate which is lower than the fixed flow rate of the permeate.

The indication of salinity provided to the system controller can be provided by measuring a third operational parameter indicative of the salinity of liquid within said liquid treatment module.

The third operational parameter can be at least one of the following measurable parameters:

flow rate of the feed liquid;
conductivity of the concentrate;
pressure of the concentrate with or without said feed liquid;
information regarding accumulation of foulants on the at least one membrane element; and
a predetermined time schedule.

The operation of the high pressure pump in the second mode can be performed upon detecting that a predetermined first threshold of the third operational parameter has been reached.

The membrane used in the method and the system of the presently disclosed subject matter can be, for example, a reverse osmosis membrane or a nanofiltration membrane, or any combination thereof.

According to the first and the second aspects of the presently disclosed subject matter, the high pressure pump is operative in at least two operational modes, i.e., a first mode in which the energy consumption of the high pressure pump is gradually increased in order to maintain fixed flow rate of the feed liquid at said feed liquid inlet or of the permeate liquid, and a second mode in which the energy consumption of the high pressure pump is sharply reduced with respect to the energy consumption in the first mode straight after a time point in which excessive concentrate of concentrate in the form of brine exists in the system in the first mode. The operation of the high pressure pump in the two operational modes is cyclic, meaning that the operation starts in the first mode, then switched to the second mode, then back to the first mode, and so on. By operating the high pressure pump in the second mode in which the system controller dictates to the high pressure pump its operational pressure, and timely instructing the high pressure pump to switch its operation from the first mode to the second mode, energy consumption of the high pressure pump is saved, and overshooting in the operation of the high pressure pump is prevented. Such overshooting is a situation in which the pump continuous to be operated at an excessively high pressure (i.e., in the first mode, with excessively high energy consumption) which is adjusted to a liquid pressure at an outlet thereof having high osmotic pressure (i.e., high salinity), when in fact the feed liquid (or mixed liquid with osmotic pressure of the feed liquid) is the only liquid that enters into the liquid treatment module since the brine is being flushed or was flushed from the system.

Any one or more of the features, designs and configurations below can be incorporated in the method of the first aspect of the presently disclosed subject matter, independently or in combination thereof.

Upon detecting that the predetermined first threshold is reached, the method can further comprise a step of lowering pressure of a mixed liquid constituted by the feed liquid and the concentrate.

The step of lowering pressure of the mixed liquid and the step of operating the high pressure pump in the second mode can be performed substantially simultaneously.

The step of lowering pressure of the mixed liquid can be performed by at least one of the following steps:

opening for a predetermined period a brine valve at a brine outlet disposed at the brine side, thereby driving at least some of the concentrate to the brine outlet; and equilibrating liquid pressures between the at least one liquid treatment module and inside of a feed liquid tank having a prefilled feed liquid, driving the concentrate from the concentrate outlet to the feed liquid tank and driving the prefilled feed liquid from the feed liquid tank to the liquid treatment module.

The step of lowering pressure of the mixed liquid can further include at least one of the following steps:

opening a pressure reducing valve downstream of the high pressure pump;

increasing liquid flow rate output of a circulation pump; and passing the feed liquid from a downstream of the high pressure pump to an upstream of the high pressure pump.

In the step of lowering pressure of the mixed liquid, the pressure can be lowered to be above the osmotic pressure of the feed liquid.

The liquid treatment system can further comprise a flow rate meter disposed in proximity to the high pressure pump or at the permeate outlet and in communication with the system controller. The method can further comprise a step of measuring, by the flow rate meter, flow rate of the feed liquid which constitutes the first operational parameter, so that upon decrease of the flow rate, in order to maintain a fixed flow rate, there is an increase in the pressure output of the high pressure pump, meaning an increase in the energy consumption of the high pressure pump, and upon increase of the flow rate, there is a decrease in the pressure output of the high pressure pump, meaning a decrease in the energy consumption of the high pressure pump.

The system can further comprise a pump controller in communication with the system controller and the high pressure pump, and the method can further comprise steps of:

receiving the first operational parameter in the system controller, and based on the variation of the first operational parameter, generating operational signals to the pump controller so as to maintain the fixed flow rate;

receiving the operational signals in the pump controller and determining based thereon an operational frequency; and instructing the high pressure pump to operate with the operational frequency, and thereby determining the energy consumption of the high pressure pump.

The second operational parameter can have a predetermined value of the operational frequency. Alternatively, the second operational parameter can have a predetermined value which is lower than the fixed flow rate of the feed liquid at said feed liquid inlet or the fixed flow rate of the permeate liquid.

The method can further comprise a step of determining the second operational parameter by the system controller.

The method can further comprise the following step: upon detecting that a second threshold of the third operational parameter is reached, reverting to the step of pressurizing feed liquid by the high pressure pump in the first mode.

The second threshold can be corresponding to a predetermined net differential pressure required for proper treatment of the feed liquid.

The method can further comprise the following step: obtaining, under control of the system controller, at least one of the first operational parameter and the third operational parameter by at least one of:

measuring conductivity of the concentrate by a conductivity meter;

measuring pressure of the concentrate with or without said feed liquid by a pressure meter;

using information regarding accumulation of foulants on the at least one membrane element; and using a predetermined time schedule.

The liquid treatment system can further comprise a circulation pump in communication with the system controller, and the method can further comprise a step of circulating the concentrate from the concentrate outlet to the feed liquid inlet by operating the circulation pump by the system controller. The circulation pump maintains a fixed flow rate of concentrate passing therethrough, under control of the system controller, notwithstanding variations in flow rate output at an outlet thereof in times corresponding changes in the system from normal operation.

Any one or more of the features, designs and configurations below can be incorporated in the system of the second aspect of the presently disclosed subject matter, independently or in combination thereof.

Upon detecting that the predetermined first threshold of the third operational parameter is reached, the system controller can further be configured for providing instructions for lowering pressure of a mixed liquid constituted by the feed liquid and the concentrate.

The system controller can be configured for providing the instructions for lowering pressure of the mixed liquid, and providing the instructions to operate the high pressure pump in the second mode, in a substantially simultaneous manner.

The system can further comprise a brine valve at a brine outlet disposed at the brine side, and the system controller can be configured for providing the instructions for lowering pressure of the mixed liquid by opening the brine valve, thereby driving at least some of the concentrate to the brine outlet.

The system can further comprise a feed liquid tank configured for receiving a prefilled feed liquid, an auxiliary brine replacement control valve disposed between the concentrate outlet and the feed liquid tank and in communication with the system controller, and an auxiliary feed liquid control valve disposed between the feed liquid tank and the feed liquid inlet and in communication with the system controller. The system controller can be configured for providing the instructions for lowering pressure of the mixed liquid by opening the auxiliary brine replacement control valve and the auxiliary feed liquid control valve so as to equilibrate liquid pressures between the at least one liquid treatment module and inside of the feed liquid tank, thereby driving the concentrate from the concentrate outlet to the feed liquid tank and the prefilled feed liquid from the feed liquid tank to the liquid treatment module.

The system controller can be configured for providing the instructions for lowering pressure of the mixed liquid, so that the pressure is lowered to be above the osmotic pressure of the feed liquid.

The system can further comprise a circulation pump in communication with the system controller and configured for circulating the concentrate from the concentrate outlet to the feed liquid inlet.

The system controller can be configured for providing the instructions for lowering pressure of the mixed liquid together with providing instructions to the circulation pump to increase liquid flow rate output thereof.

The system can further comprise a conductivity meter configured for measuring conductivity of the concentrate or of the mixed liquid, so as to determine at least one of the first operational parameter and the third operational parameter.

The system can further comprise a pressure meter configured for measuring pressure of the concentrate or of the mixed liquid, so as to determine at least one of the first operational parameter and the third operational parameter.

The system controller can be configured for providing the instructions for lowering pressure of the mixed liquid, so that the pressure is lowered to be above the osmotic pressure of the feed liquid.

The system can further comprise a recycle conduit control valve disposed between an upstream and a downstream of the high pressure pump and in communication with the system controller, and the system controller can be configured for providing the instructions for lowering pressure of the mixed liquid at the feed liquid inlet together with providing instructions to open the recycle conduit control valve so as to pass the feed liquid from the downstream of the high pressure pump to the upstream of the high pressure pump.

The system can further comprise a flow rate meter disposed in proximity to the high pressure pump or at the permeate outlet and in communication with the system controller for providing to the system controller measurements of flow rate of the feed liquid which constitutes the first operational parameter, so that upon decrease of the flow rate, in order to maintain a fixed flow rate, there is an increase in the pressure output of the high pressure pump, meaning an increase in the energy consumption of the high pressure pump, and upon increase of the flow rate, there is a decrease in the pressure output of the high pressure pump, meaning a decrease in the energy consumption of the high pressure pump.

The system can further comprise a pump controller in communication with the system controller and the high pressure pump; wherein the system controller is configured for receiving the first operational parameter and based on the variation of the first operational parameter, generating operational signals to the pump controller so as to maintain the fixed flow rate; and wherein the pump controller is configured for receiving the operational signals and determining based thereon an operational frequency, and instructing the high pressure pump to operate with the operational frequency, so as to determine the energy consumption of the high pressure pump.

The second operational parameter can be a predetermined value of the operational frequency.

The second operational parameter can have a predetermined value which is lower than the fixed flow rate of the feed liquid at said feed liquid inlet or the fixed flow rate of the permeate liquid.

The system controller can further be configured for determining the second operational parameter.

The system controller can further be configured for controlling operation of the system by: upon detecting that a second threshold of the third operational parameter is reached, providing instructions to operate the high pressure pump in the first mode.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
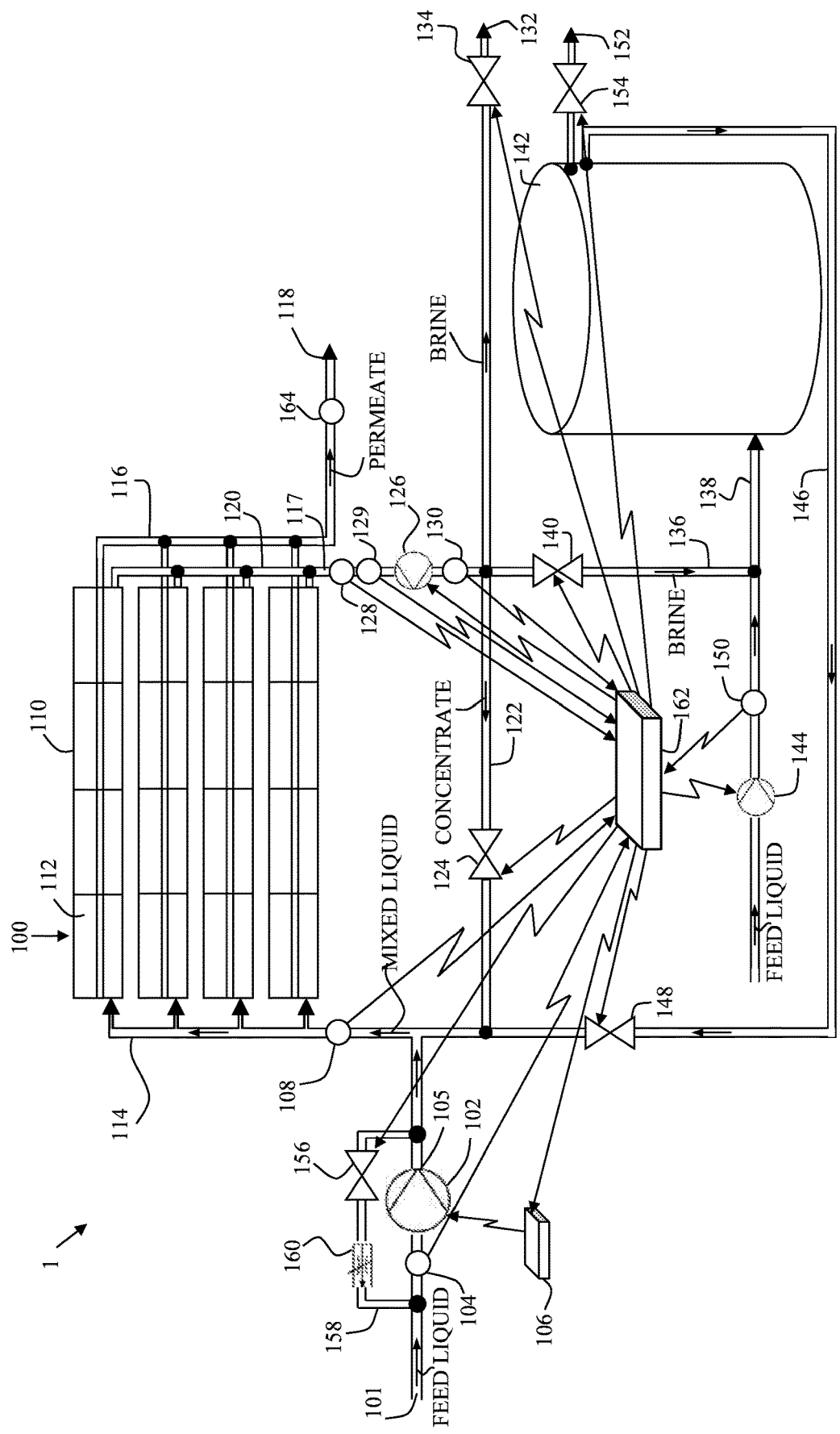
FIG. 1 is a simplified illustration of a system for liquid treatment constructed and operative in accordance with one example of the presently disclosed subject matter.

Reference is now made to FIG. 1, simplified illustration of a liquid treatment system 1 for treatment of feed liquid, in accordance with one example of the presently disclosed subject matter. The feed liquid is shown in FIG. 1 by an arrow labeled FEED LIQUID representing flow direction thereof. Although the feed liquid according to the examples presented below is seawater, other types of feed liquid such as saline solution, brackish water and waste water, can be treated by the system 1 as well.

The system 1 comprises a liquid treatment module 100, having a plurality of pressure vessels 110 arranged in parallel. Each pressure vessel 110 includes a plurality of membrane elements 112, typically eight in number, only four being shown in the drawings for the sake of illustration. The membrane elements 112 are reverse osmosis membranes. The pressure vessels 110 are commercially available from various vendors, for example BEL Composite Industries Ltd, Industrial Zone, Kiryat Yehudit, P.O.B. 4, 84100 Beer Sheva, Israel, and the membrane elements 112 are commercially available from various vendors, for example LG NanoH2O, 750 Lairport Street, El Segundo, Calif. 90245.

The liquid treatment module 100 has a feed liquid inlet 101 at a feed side of the membrane elements 112 and in fluid communication with the pressure vessels 110 via a feed manifold 114. The feed liquid to be treated by the system is supplied from the feed liquid inlet 101, into the pressure vessels 110 via the feed manifold 114. The liquid treatment module 100 further has a permeate outlet 118 at a permeate side of the membrane elements 112 and in fluid communication with the pressure vessels 110 via a permeate manifold 116. Treated liquid, hereinafter referred to as permeate, is supplied from the pressure vessels 110 via the permeate manifold 116 to the permeate outlet 118. The permeate is shown in FIG. 1 by an arrow labeled PERMEATE representing flow direction of the flow thereof towards the permeate outlet 118. A permeate flow rate meter 164 is disposed at the permeate outlet 118 for monitoring flow rate of the permeate.

The liquid treatment module 100 further has a concentrate outlet 117 at a brine side of the membrane elements and in fluid communication with the pressure vessels 110 via a concentrate manifold 120. A concentrate pressure meter 128, a concentrate conductivity meter 129 and a concentrate flow rate meter 130 are provided downstream of concentrate manifold 120.

In steady state normal operation of the system 1, the concentrate from the concentrate manifold 120 that was previously treated in the module 100, is resupplied to the module 100 for further treatment. In particular, the concentrate is directed back to the feed manifold 114 via a recirculation conduit 122 and a recirculation control valve 124 by employing a circulation pump 126. The concentrate is shown in FIG. 1 by an arrow labeled CONCENTRATE representing the recirculation flow in the recirculation conduit 122.

The system 1 further has a high pressure pump 102 disposed between the feed liquid inlet 101 and the feed manifold 114, and operative for pressurizing the feed liquid passing therethrough. The high pressure pump has a pump outlet 105 (shown in FIG. 1). A feed liquid flow rate meter 104 is disposed upstream of the high pressure pump 102 for monitoring flow rate of the feed liquid.

The high pressure pump 102 may be any suitable type of pump, such as a positive displacement pump. An example of a positive displacement pump is a Danfoss APP 21-43 high pressure pump, commercially available from Danfoss A/S Nordborgvej 81, 6430 Nordborg, Denmark. The high pressure pump 102 is operative to pressurize the feed liquid to be treated to typical pressures of up to approximately 70 bar for sea water.

In the feed manifold 114, the concentrate is mixed with the feed liquid, as shown in FIG. 1 by an arrow labeled MIXED LIQUID, representing flow direction of the mixed liquid in the feed manifold 114. The mixed liquid enters the pressure vessels 110 for desalination via a mixed liquid pressure meter 108 disposed upstream of the feed manifold 114.

Since in steady state normal operation of the system 1, the concentrate is circulated within the system, the osmotic pressure of the concentrate is increased over time. Once the concentration of the concentrate increases to a predetermined level at which continued liquid treatment is deemed not to be practicable, the concentrate is flushed from the system 1, thereby reducing the osmotic pressure of the mixed liquid. As described hereinbelow, the salinity of the mixed liquid can be reduced by supplying only feed liquid instead of a mixture of feed liquid and recirculated concentrate.

The concentrate that exits the liquid treatment module 100 and is not recirculated is referred to herein as brine, as shown in FIG. 1 by an arrow labeled BRINE. The salinity of the brine that is flushed is greater than the salinity of the concentrate that is recirculated via the recirculation conduit 122.

The brine may be flushed from the liquid treatment module 100 through a brine outlet 132 via a brine valve 134, while the recirculation control valve 124 is closed. This operational example is presented in FIGS. 4A-4C.

The brine from each of the pressure vessels 110 may also be flushed from concentrate manifold 120 via an auxiliary brine replacement conduit 136, an auxiliary tank feed conduit 138 and an auxiliary brine replacement control valve 140 to an auxiliary feed liquid tank 142.

During flushing of the brine via the auxiliary feed liquid tank 142, the recirculation control valve 124 and the brine valve 134 are closed. The auxiliary feed liquid tank 142 is filled, prior to the opening of the auxiliary brine replacement control valve 140, with feed liquid by an auxiliary feed liquid pump 144. Brine driven by the circulation pump 126 drives the feed liquid from the auxiliary feed liquid tank 142 to the feed manifold 114 via an auxiliary feed liquid conduit 146 and an auxiliary feed liquid control valve 148. An auxiliary liquid flow meter 150 is provided upstream of auxiliary feed liquid tank 142. After full replacement of brine by feed liquid in the module 100, the recirculation control valve 124 is opened and the auxiliary brine replacement control valve 140 and the auxiliary feed liquid control valve 148 are closed. Then auxiliary feed liquid pump 144 fills auxiliary feed liquid tank 142 with feed liquid, which drives the brine to an auxiliary brine outlet 152 via an auxiliary brine outlet tank control valve 154. This operational example is presented in FIGS. 2A-2D.

In some examples, liquid pressure at the feed side of the module 100 may be quickly reduced at desired points in time by operation of a recycle conduit control valve 156 to redirect feed liquid from downstream of high pressure feed pump 102 to upstream of pump 102 through a conduit 158 and possibly through a flow restrictor 160, which limits the pressure reduction to a pressure above atmospheric pressure and above the osmotic pressure of the feed liquid.

The system 1 further has a system controller 162, which controls the operation of the high pressure feed pump 102 via a pump controller 106, the circulation pump 126, the auxiliary feed liquid pump 144, the recirculation control valve 124, the brine valve 134, the auxiliary brine replacement control valve 140, the auxiliary feed liquid control valve 148, the auxiliary brine outlet tank control valve 154, and the recycle conduit control valve 156. The system controller 162 is further configured to receive measurements from the mixed feed liquid pressure meter 108, the feed liquid flow rate meter 104, the concentrate pressure meter 128, the concentrate conductivity meter 129, the concentrate flow rate meter 130, the permeate flow rate meter 164 and the auxiliary liquid flow meter 150. Based on these measurements, the system controller 162 determines in which pressure the high pressure pump 102 should pump the feed liquid in order to maintain fixed flow rate of the feed liquid at said feed liquid inlet or of the permeate in order to maintain fixed net differential pressure (NDP) required for proper desalination of the feed liquid. The system controller 162 thus generates operational signals to the pump controller 106. These operational signals are transformed by the pump controller 106 to operational frequency in which the high pressure pump pumps the feed liquid, thereby determining the energy consumption of the high pressure pump 102. This means that increase of the operational frequency increases the energy consumption of the high pressure pump, and decrease of the operational frequency decreases the energy consumption of the high pressure pump 102.

The pump controller 106 can be, for example, an ABB ACS800-U1 controller, commercially available from ABB Inc. MS 3L7 29801 Euclid Ave, Wickliffe, Ohio 44092-2530, USA.

The above description of the system 1 of FIG. 1 provides general information about its components and the relationship therebetween. However, in order to execute the method of the presently disclosed subject matter, only part of these components can be used in different configurations thereof, as described below with respect to the specific examples of FIGS. 2A-2D and 4A-4C. Therefore, the components of the system 1 which are not used in the examples of FIGS. 2A-2D and 4A-4C can be removed from the system presented in these examples.

Reference is now made to FIGS. 2A-2D and 3, in which one example of the system and the method of the presently disclosed subject matter is shown.

During circulation of the concentrate within the system 1, increase of the osmotic pressure of the concentrate, and respectively of the mixed liquid occurs. The increase of the osmotic pressure requires a corresponding increase in fluid pressure at the feed side of the module 100 in order to maintain permeate production. This increase of pressure is provided by the high pressure pump 102 under control of the system controller 162 and the pump controller 106.

As mentioned above, the system controller 162 is configured for controlling operation of different components of the system 1. In particular, the system controller 162 provides instructions to the pump controller 106 to operate the high pressure pump 102 in two operation modes: a first mode, shown in FIGS. 2A, 2C and 2D, and a second mode, shown in FIG. 2B. The operation of the high pressure pump 102 in the two operational modes is cyclic, meaning that the operation starts in the first mode (FIG. 2A), then switches to the second mode (FIG. 2B), then back to the first mode (FIGS. 2C and 2D), and so on.

In the first mode, the high pressure pump 102 maintains a fixed flow rate of the feed liquid, while energy consumption of the high pressure pump 102 is a function of variations of a first operational parameter measured in the system and indicative of salinity of liquid within the liquid treatment module 100. According to the example of FIGS. 2A-2D, the first operational parameter is the flow rate of the feed liquid, which is measured by the flow rate meter 104. This flow rate of the feed liquid is indicate of salinity of liquid within the module 100.

Since the osmotic pressure of the concentrate and respectively of mixed liquid is increased over time, the flow rate of the feed liquid is decreased. In order to compensate the decrease of the flow rate of the feed liquid and maintain the fixed flow rate thereof, the energy consumption of the high pressure pump 102 is increased as a result of increase of the operational frequency provided by the pump controller 106. The operational frequency is determined by the pump controller 106 according to instructions received from the system controller 162, that receives the measurements from the flow rate meter 104 and performs respective calculations to provide said instructions.

In the second mode, the high pressure pump 102 maintains a flow rate of the feed liquid which is lower than the fixed flow rate in the first mode, while energy consumption of the high pressure pump 102 is a function of a second operational parameter determined so as to reduce energy consumption of the high pressure pump. According to the present example, the second operational parameter is a predetermined operational frequency provided by the pump controller 106, which is much lower than the operational frequency with which the high pressure pump 102 was operated in the first mode before switching to the second mode.

In summary, in the first mode, the energy consumption of the high pressure pump 102 is gradually increased in order to maintain the fixed flow rate of the feed liquid, and in the second mode in which the energy consumption of the high pressure pump is sharply reduced immediately with respect to the energy consumption in the first mode at a point in time in which excessive concentrate of concentrate in the form of brine exists in the system in the first mode.

By operating the high pressure pump 102 in the second mode in which the system controller 162 dictates to the high pressure pump its operational pressure, and timely instructing the high pressure pump 102 to switch its operation from the first mode to the second mode, energy consumption of the high pressure pump 102 is saved, and overshooting in the operation of the high pressure pump is prevented. Such overshooting is a situation in which the high pressure pump continuous to be operated at an excessively high pressure (i.e., in the first mode, with excessively high energy consumption) which is adjusted to a liquid pressure at an outlet thereof having high osmotic pressure (i.e., high salinity), when in fact the osmotic pressure of the liquid at the outlet of the pump is much lower and liquid with osmotic pressure of the feed liquid enters into the liquid treatment module since the brine is being flushed or was flushed from the system.

It should be indicated that the first operational parameter can alternatively be obtained by one or more of the following operations:
    measuring conductivity of the concentrate by the concentrate conductivity meter 129;
    measuring pressure of the concentrate by the concentrate pressure meter 128;
    measuring pressure of the mixed liquid by the mixed liquid pressure meter 108;
    using information regarding accumulation of foulants on the membrane elements 112; and
    using a predetermined time schedule.

Figure 2A:
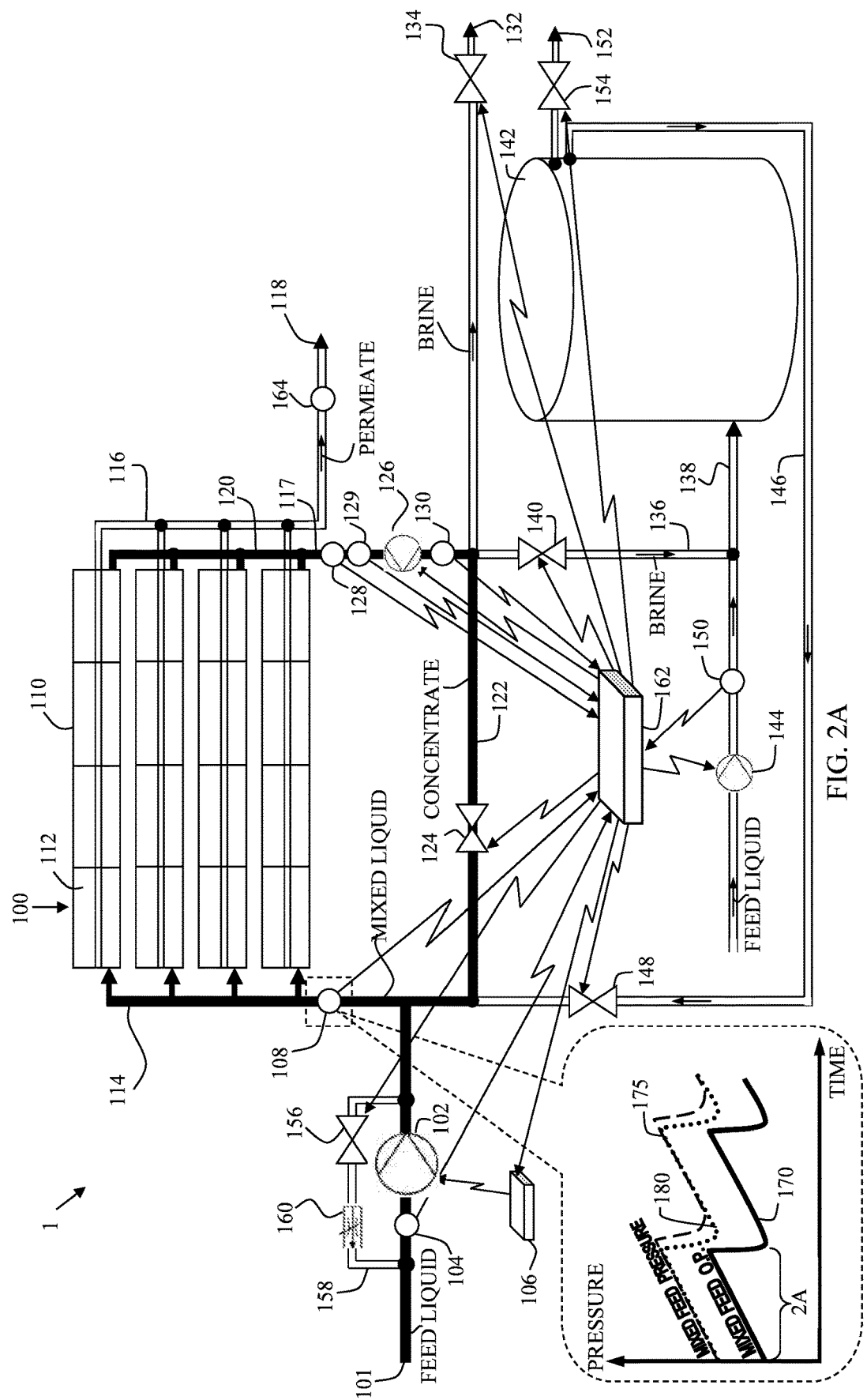
FIGS. 2A, 2B, 2C and 2D are simplified illustrations showing various stages of liquid flow according to a first example for operating the system of FIG. 1.

Reference is now made specifically to FIG. 2A, in which the system 1 desalinates the feed liquid in its steady state normal operation, and the high pressure pump 102 is operated in its first mode. The liquid flow during this stage is represented in solid black lines.

Under control of the system controller 162, the brine valve 134, the auxiliary brine replacement control valve 140, the auxiliary feed liquid control valve 148, the auxiliary brine outlet tank control valve 154 and the recycle conduit control valve 156 are all closed and the recirculation control valve 124 is open.

The feed liquid is pumped by the high pressure pump 102, and the concentrate from concentrate manifold 120 is directed back to input of feed manifold 114 via the recirculation conduit 122 and the recirculation control valve 124. In feed manifold 114, the concentrate is mixed with feed liquid, and the mixed liquid enters the pressure vessels 110 for further treatment.

During this stage, the osmotic pressure of the mixed liquid gradually increases since the salinity of the concentrate gradually increases. In order to maintain fixed flow rate of the feed liquid, the energy consumption of the high pressure pump 102 respectively gradually increases as a result of instructions provided by the system controller 162 to the pump controller 102, and the above described recirculation process continues. In addition, during this stage, a third operational parameter in the form of liquid pressure is measured in the system and indicative of salinity of liquid within the liquid treatment module 100. The third operational parameter is provided to the system controller 162, and according to the present example, the third operational parameter is pressure of the mixed liquid, which is measured by the mixed liquid pressure meter 108. A typical graph showing periodic variations in mixed feed liquid pressure as measured by pressure meter 108 over time and a respective graph of estimated mixed liquid osmotic pressure over time appear in an enlargement forming part of FIGS. 2A to 2D, and in FIG. 3. As shown in FIG. 3, the estimated mixed liquid osmotic pressure is represented by line 170, and the mixed liquid pressure is represented by line 180. Thus, during operation of the high pressure pump in the first mode, when the feed liquid from the high pressure 102 is mixed with the concentrate from the recirculation conduit 122, the mixed liquid osmotic pressure gradually increases as seen in the gradual slope of line 170, and the mixed liquid pressure is increased respectively due to increase of the operational frequency of the high pressure pump 102 in order to maintain fixed flow rate of the feed liquid. The difference between the gradual slope of line 170 and line 180 is the NDP required for proper desalination of the feed liquid, and as can be seen in FIG. 3, the NDP is maintained fixed during the first mode.

During the first mode, the system controller 162 compares the mixed liquid pressure to a predetermined first threshold, which is 70 Bar according to the example of FIG. 3. Dashed vertical lines 'A' represent points in time where the first threshold is reached. The first threshold represents pressure of mixed liquid at which continued liquid treatment is deemed not to be practicable.

Upon detecting that the first threshold is reached, the system controller 162 starts controlling operation of the high pressure pump 102 in its second mode, in accordance with the second operational parameter. As presented in FIG. 3, the first mode lasts until line A, and the second mode starts from this line.

In the second mode, in accordance with instructions received from the system controller 162, the pump controller 106 instructs the high pressure pump 102 to operate in a predetermined operational frequency which is much lower than the operational frequency with which the high pressure pump 102 was operated in the first mode before switching to the second mode, at the time point in which the first threshold was reached. This predetermined operational frequency sharply reduces the energy consumption of the high pressure pump 102, and therefore, its pumping pressure of the feed liquid.

Upon detecting that the first threshold is reached, in addition to switching to the second mode, the system also starts simultaneously lowering pressure of the mixed liquid by flushing the concentrate, which is now brine.

Figure 2B:
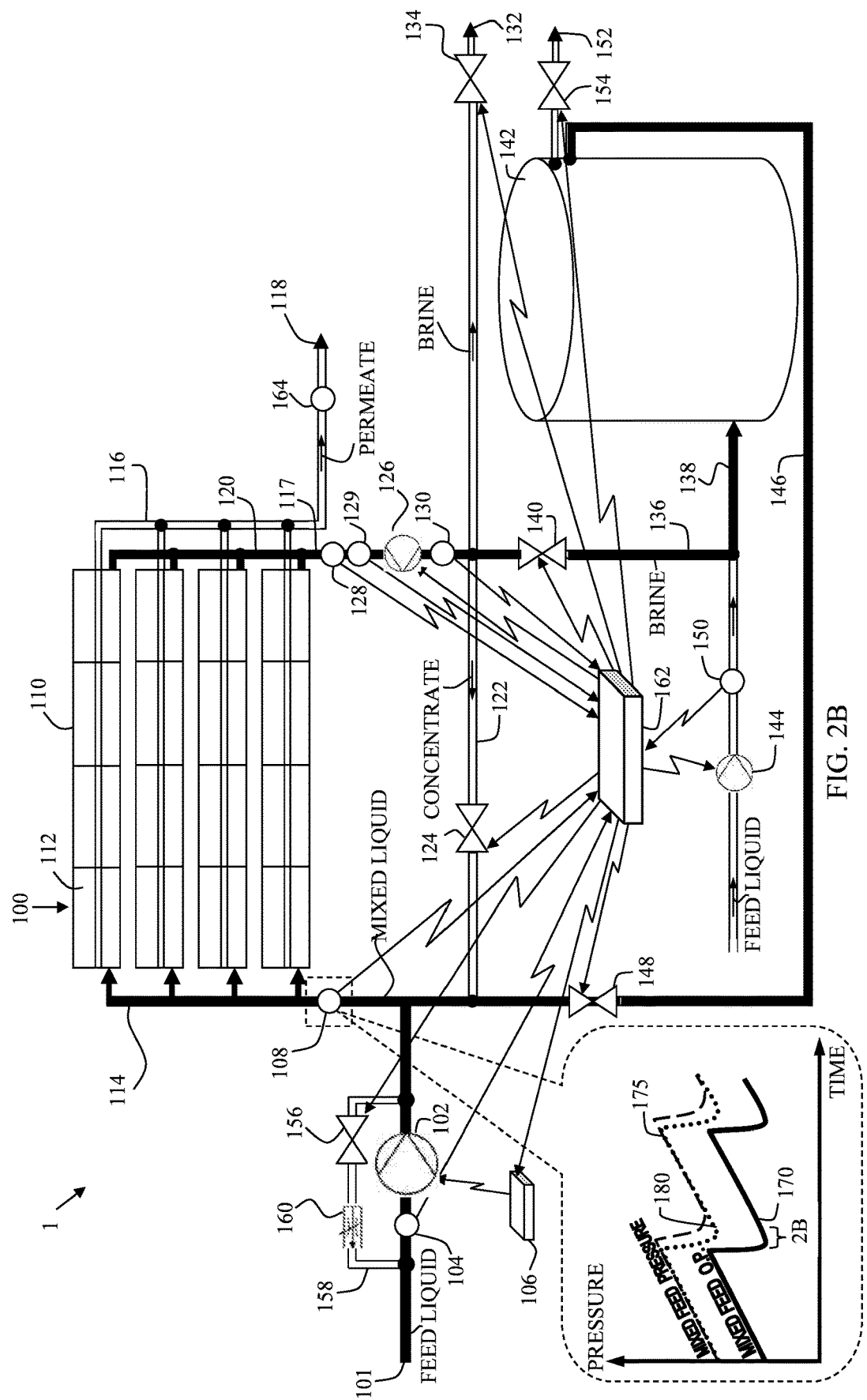
Figure 3:
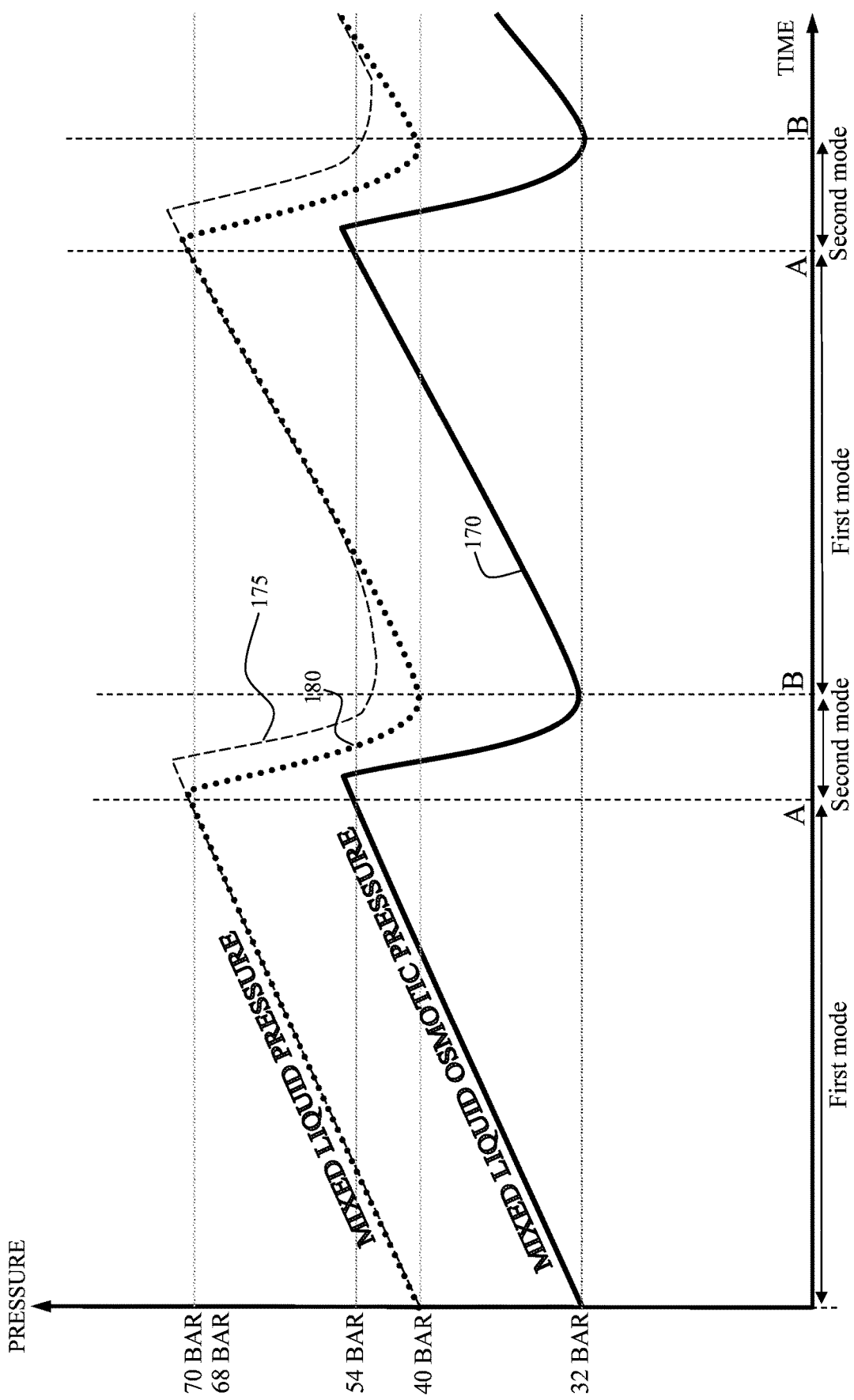
FIG. 3 is a simplified illustration of periodic variations in mixed liquid pressure and mixed liquid osmotic pressure during operation of the system according to the first example of FIGS. 2A, 2B, 2C and 2D, with distinction from the prior art.

Reference is now made to FIG. 2B, in which solid black lines show the flow that takes place during the flushing process. According to the present example, the flushing of the brine is performed by equilibrating liquid pressures between the liquid treatment module 100 and inside of the feed liquid tank 142 having a prefilled feed liquid, driving the brine from the concentrate outlet 117 to the feed liquid tank 142 and driving the prefilled feed liquid from the feed liquid tank 142 to the liquid treatment module 100.

In order to start the flushing, the system controller 162 opens the auxiliary brine replacement control valve 140, closes recirculation control valve 124 and opens the auxiliary feed liquid control valve 148. Brine from the concentrate manifold 120 flows through the auxiliary brine replacement conduit 136 and the auxiliary brine replacement control valve 140 via the auxiliary tank feed conduit 138 to the auxiliary feed liquid tank 142. The auxiliary feed liquid tank 142 is filled with feed liquid prior to the opening of the auxiliary brine replacement control valve 140, as described hereinbelow. The brine enters the auxiliary feed liquid tank 142 and drives feed liquid from the auxiliary feed liquid tank 142 to feed manifold 114 via the auxiliary feed liquid conduit 146 and the auxiliary feed liquid control valve 148.

Reference is now made again to FIG. 3, in order to discuss the graphs shown therein during the second mode of the high pressure pump 102 and the flushing process of the brine.

During the flushing process, the concentrate is not recirculated back to feed manifold 114, thus only feed liquid enters the feed manifold 114 and the mixed osmotic pressure decreases sharply, as shown in the sharp decline in line 170. Moreover, during the second mode of the high pressure pump, the pressure of the feed liquid is sharply reduced, as shown in the sharp decline in line 180.

Line 175 in FIG. 3 illustrates the behavior of the mixed liquid pressure in a prior art system in which the high pressure pump is not operated in two modes, but only in a single mode. As can be observed, the mixed liquid pressure line 175 begins its drop (denoted by the dotted line to the right of dotted line A) only after the mixed liquid osmotic pressure already dropped below a certain threshold, thereby experiencing overshooting. The difference, represented by the area delimited between line 175 and line 180, illustrates the energy benefit of operation at lower pressures for desalination of sea water by the system and method of the presently disclosed subject matter, and thus saving energy and preventing overshooting. In the prior art system, the operational frequency of the high pressure pump is reduced as a result of flushing of the brine, causing reduction of the mixed liquid pressure.

Figure 2C:
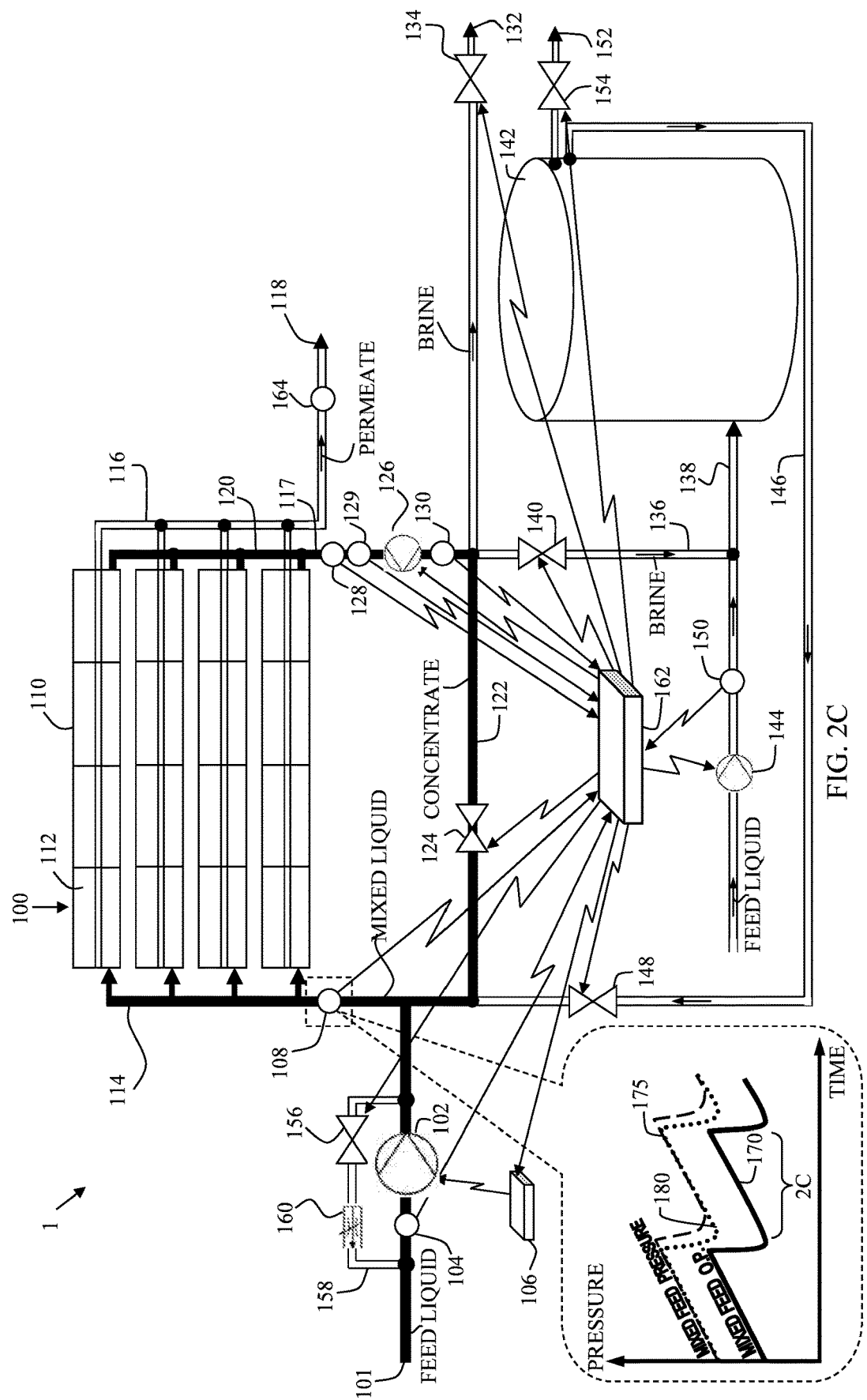

The concentrate flow rate meter 130 measures the cumulative volume of brine flowing from the concentrate manifold 120, and thus measures the cumulative volume of feed liquid entering the feed manifold 114 via the auxiliary feed liquid conduit 146 and the auxiliary feed liquid control valve 148, which replaces the brine in module 100. Therefore, based on the measurements of the concentrate flow rate meter 130 it is known when the concentrate volume in the module exited it completely. At these points in time, which are represented by dashed vertical lines 'B', the operation of the high pressure pump 102 in the second mode is terminated, and the system controller 162 reverts to controlling operation of the high pressure pump in the first mode. At this point in time, the flushing process of the brine is also terminated. After full replacement of the brine with feed liquid in the module 100, the system controller 162 reopens recirculation control valve 124, and closes the auxiliary brine replacement control valve 140 and auxiliary feed liquid control valve 148, providing a fluid flow as shown in FIG. 2C, which may be identical to the fluid flow illustrated in FIG. 2A.

Figure 2D:
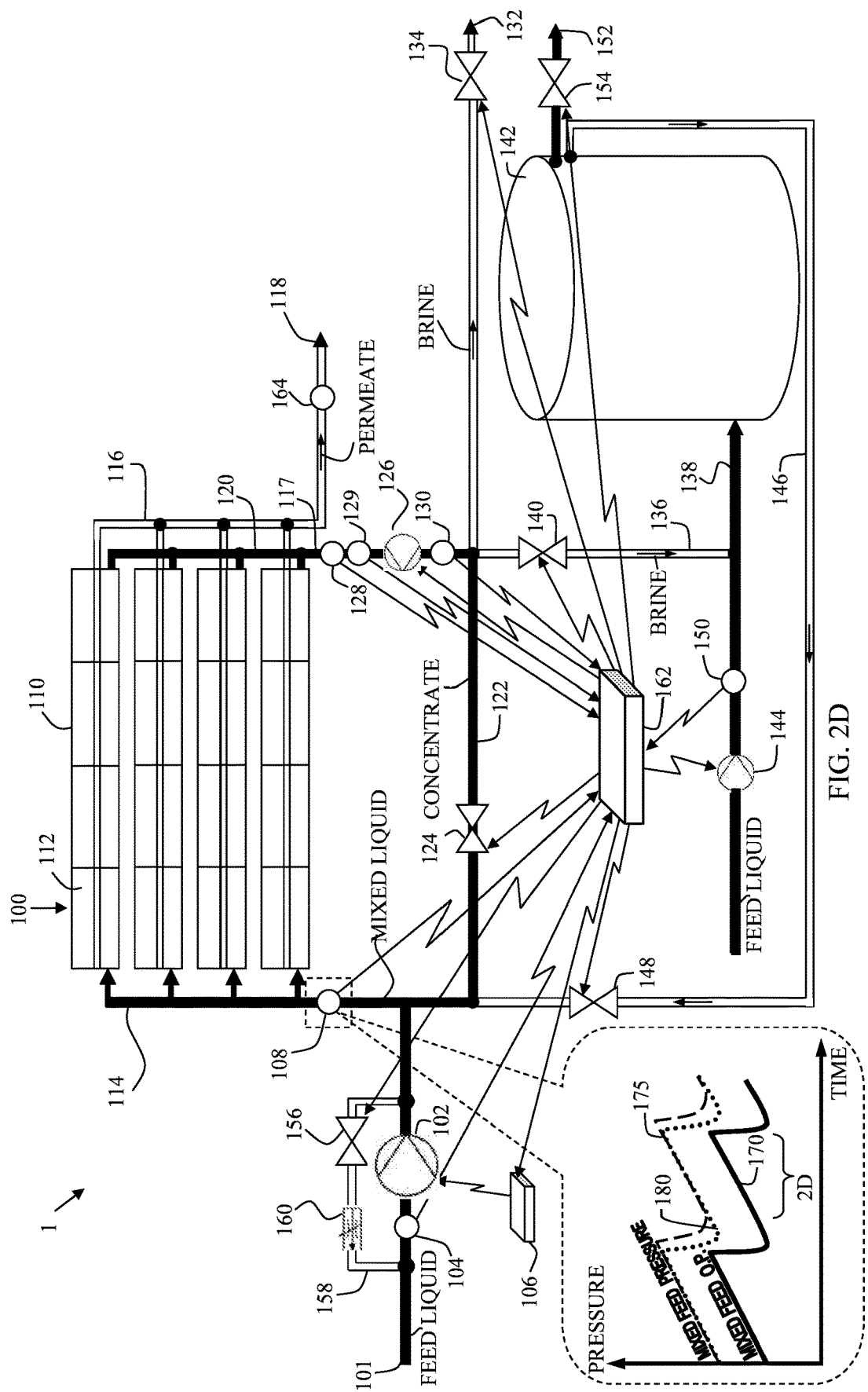

Thereafter, the system controller 162 periodically activates the auxiliary feed liquid pump 144 and opens the auxiliary brine outlet tank control valve 154 to flush all brine from auxiliary feed liquid tank 142 through an auxiliary brine outlet 152 to a location outside of the system 1 and fill the auxiliary feed tank 142 with feed liquid for further replacement of the brine in module 100 with feed liquid as described hereinabove, as seen in FIG. 2D. Following full replacement of brine with feed liquid in the feed liquid tank 142, as measured by the auxiliary flow meter 150, the system controller 162 closes the auxiliary brine outlet tank control valve 154 and terminates operation of the auxiliary feed liquid pump 144. The mixed liquid pressure and the mixed liquid osmotic pressure of the system of FIGS. 2C and 2D, can be seen immediately after the vertical line 'B'.

It should be indicated that the process of flushing the brine, can also be accompanied with one or more of the following processes performed under control of the system controller 162:

opening a pressure reducing valve (not shown) downstream of the high pressure pump;

increasing liquid flow rate output of the circulation pump 126; and passing the feed liquid from a downstream of the high pressure pump 102 to an upstream of the high pressure pump 102, thereby lowering the feed liquid pressure at the manifold 114. For this operation, the system controller 162 opens the recycle conduit control valve 156.

It should further be indicated that the third operational parameter can alternatively be obtained by one or more of the following operations:

measuring conductivity of the concentrate by the concentrate conductivity meter 129;

measuring pressure of the concentrate by the concentrate pressure meter 128;

using information regarding accumulation of foulants on the membrane elements 112; and using a predetermined time schedule.

Reference is now made to FIGS. 4A-4C and 5, in which another example of the system and the method of the presently disclosed subject matter is shown.

During circulation of the concentrate within the system 1, increase of the osmotic pressure of the concentrate, and respectively of the mixed liquid occurs. The increase of the osmotic pressure requires a corresponding increase in fluid pressure at the feed side of the module 100 in order to maintain permeate production. This increase of pressure is provided the high pressure pump 102 under control of the system controller 162 and the pump controller 106.

As mentioned above, the system controller 162 is configured for controlling operation of different components of the system 1. In particular, the system controller 162 provides instructions to the pump controller 104 to operate the high pressure pump 102 in two operation modes: a first mode, shown in FIGS. 4A and 4C, and a second mode, shown in FIG. 4B. The operation of the high pressure pump 102 in the two operational modes is cyclic, meaning that the operation starts in the first mode (FIG. 4A), then switched to the second mode (FIG. 4B), then back to the first mode (FIG. 4C), and so on.

In the first mode, the high pressure pump 102 maintains a fixed flow rate of the permeate, while energy consumption of the high pressure pump 102 is a function of variations of a first operational parameter measured in the system and indicative of salinity of liquid within the liquid treatment module 100. According to the example of FIGS. 4A-4C, the first operational parameter is the flow rate of the permeate, which is measured by the permeate flow rate meter 164. Since the osmotic pressure of the concentrate and respectively of mixed liquid is increased over time, the flow rate of the permeate is decreased. In order to compensate the decrease of the flow rate of the permeate and maintain the fixed flow rate thereof, the energy consumption of the high pressure pump 102 is increased as a result of increase of the operational frequency provided by the pump controller 106. The operational frequency is determined by the pump controller 106 according to instructions received from the system controller 162, that receives the measurements from the permeate flow rate meter 164 and performs respective calculations to provide said instructions.

In the second mode, the high pressure pump 102 maintains a flow rate of the feed liquid which is lower than the fixed flow rate in the first mode, while energy consumption of the high pressure pump 102 is a function of a second operational parameter determined so as to reduce energy consumption of the high pressure pump. According to the present example, the second operational parameter is a predetermined fixed flow rate of the permeate dictated by the system controller 162, which is much lower than fixed flow rate of the permeate that was maintained in the first mode before switching to the second mode. The predetermined fixed flow rate in the second mode can be, for example, 10% of the fixed flow rate in the first mode. By providing the predetermined fixed flow rate in the second mode to the controller 162, respective instructions are provided from the system controller 162 to the pump controller 106, resulting in sharp reduction of the operational frequency provided by the pump controller 106 to the high pressure pump 102, resulting in sharp reduction of energy consumption of the high pressure pump 102.

In summary, in the first mode, the energy consumption of the high pressure pump 102 is gradually increased in order to maintain the fixed flow rate of the permeate, and in the second mode in which the energy consumption of the high pressure pump of sharply reduced straight after a time point in which the too much brine (i.e., high concentration of concentrate) exists in the system.

By operating the high pressure pump 102 in the second mode in which the system controller dictates to the high pressure pump 102 its operational pressure, and timely instructing the high pressure pump 102 to switch its operation from the first mode to the second mode, energy consumption of the high pressure pump 102 is saved, and overshooting in the operation of the high pressure pump is prevented. Such overshooting is a situation in which the high pressure pump continuous to be operated at an excessively high pressure (i.e., in the first mode, with excessively high energy consumption) which is adjusted to a liquid pressure at an outlet thereof having high osmotic pressure (i.e., high salinity), when in fact the feed liquid (or mixed liquid with osmotic pressure of the feed liquid) is the only liquid that enters into the liquid treatment module.

It should be indicated that the first operational parameter can alternatively be obtained by one or more of the following operations:
- measuring conductivity of the concentrate by the concentrate conductivity meter 129;
- measuring flow rate of the feed liquid by the feed flow meter 104;
- measuring pressure of the concentrate by the concentrate pressure meter 128;
- measuring pressure of the mixed liquid by the mixed liquid pressure meter 108;
- using information regarding accumulation of foulants on the membrane elements 112; and
- using a predetermined time schedule.

Figure 4A:
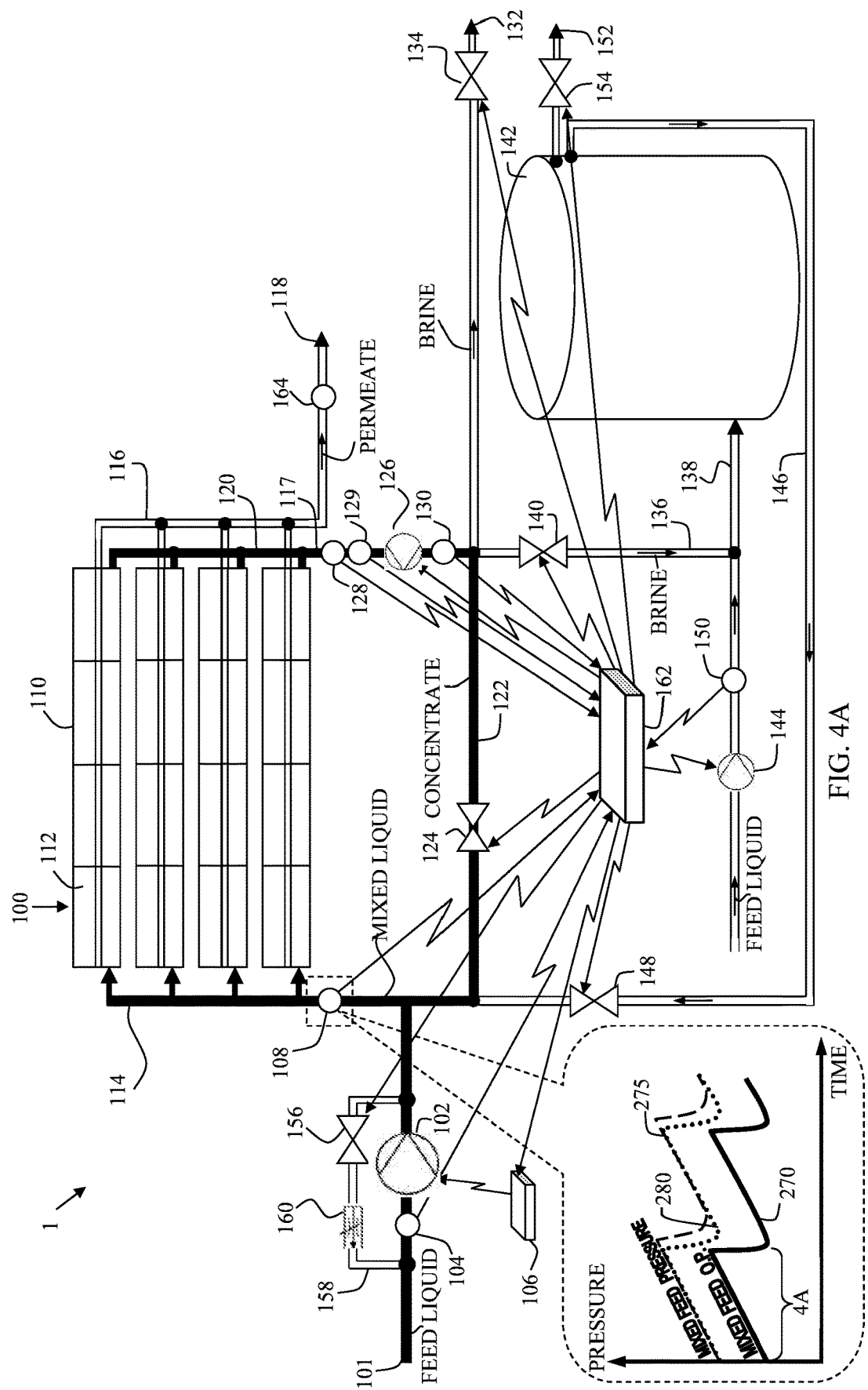
FIGS. 4A, 4B and 4C are simplified illustrations showing various stages of liquid flow according to a second example for operating the system of FIG. 1.

Reference is now made specifically to FIG. 4A, in which the system 1 desalinates the feed liquid in its steady state normal operation, and the high pressure pump 102 is operated in its first mode. The liquid flow during this stage is represented in solid black lines.

Under control of the system controller 162, the brine valve 134, the auxiliary brine replacement control valve 140, the auxiliary feed liquid control valve 148, the auxiliary brine outlet tank control valve 154 and the recycle conduit control valve 156 are all closed and the recirculation control valve 124 is open.

The feed liquid is pumped by the high pressure pump 102, and the concentrate from concentrate manifold 120 is directed back to input of feed manifold 114 via the recirculation conduit 122 and the recirculation control valve 124. In feed manifold 114, the concentrate is mixed with feed liquid, and the mixed liquid enters the pressure vessels 110 for further treatment.

During this stage, the osmotic pressure of the mixed liquid gradually increases since the salinity of the concentrate gradually increases. In order to maintain fixed flow rate of the permeate, the energy consumption of the high pressure pump 102 respectively gradually increases as a result of instructions provided by the system controller 162 to the pump controller 106, and the above described recirculation process continues. In addition, during this stage, a third operational parameter in the form of liquid pressure is measured in the system and indicative of salinity of liquid within the liquid treatment module 100. The third operational parameter is provided to the system controller 162, and according to the present example, the third operational parameter is pressure of the mixed liquid, which is measured by the mixed liquid pressure meter 108. A typical graph showing periodic variations in mixed feed liquid pressure as measured by pressure meter 108 over time and a respective graph of estimated mixed liquid osmotic pressure over time appear in an enlargement forming part of FIGS. 4A to 4C, and in FIG. 5. As shown in FIG. 5, the estimated mixed liquid osmotic pressure is represented by line 270, and the mixed liquid pressure is represented by line 280. Thus, during operation of the high pressure pump in the first mode, when the feed liquid from the high pressure 102 is mixed with the concentrate from the recirculation conduit 122, the mixed liquid osmotic pressure gradually increases as seen in the gradual slope of line 270, and the mixed liquid pressure is increased respectively due to increase of the operational frequency of the high pressure pump 102 in order to maintain fixed flow rate of the permeate.

During the first mode, the system controller 162 compares the mixed liquid pressure to a predetermined first threshold, which is 70 Bar according to the example of FIG. 5. Dashed vertical lines 'C' represent points in time where the first threshold is reached. The first threshold represents pressure of mixed liquid at which continued liquid treatment is deemed not to be practicable.

Upon detecting that the first threshold is reached, the system controller 162 starts controlling operation of the high pressure pump 102 in its second mode, in accordance with the second operational parameter, which is a predetermined fixed flow rate being lower than the fixed flow rate in the first mode. As presented in FIG. 5, the first mode lasts until line C, and the second mode starts from this line.

In the second mode, in accordance with instructions received from the system controller 162, the pump controller 106 instructs the high pressure pump 102 to operate in a predetermined operational frequency which is much lower than the operational frequency with which the high pressure pump 102 was operated in the first mode before switching to the second mode, at the time point in which the first threshold was reached. This predetermined operational frequency sharply reduces the energy consumption of the high pressure pump 102, and therefore, its pumping pressure of the feed liquid.

Upon detecting that the first threshold is reached, in addition to switching to the second mode, the system also starts simultaneously lowering pressure of the mixed liquid by flushing the concentrate, which is now brine.

Figure 4B:
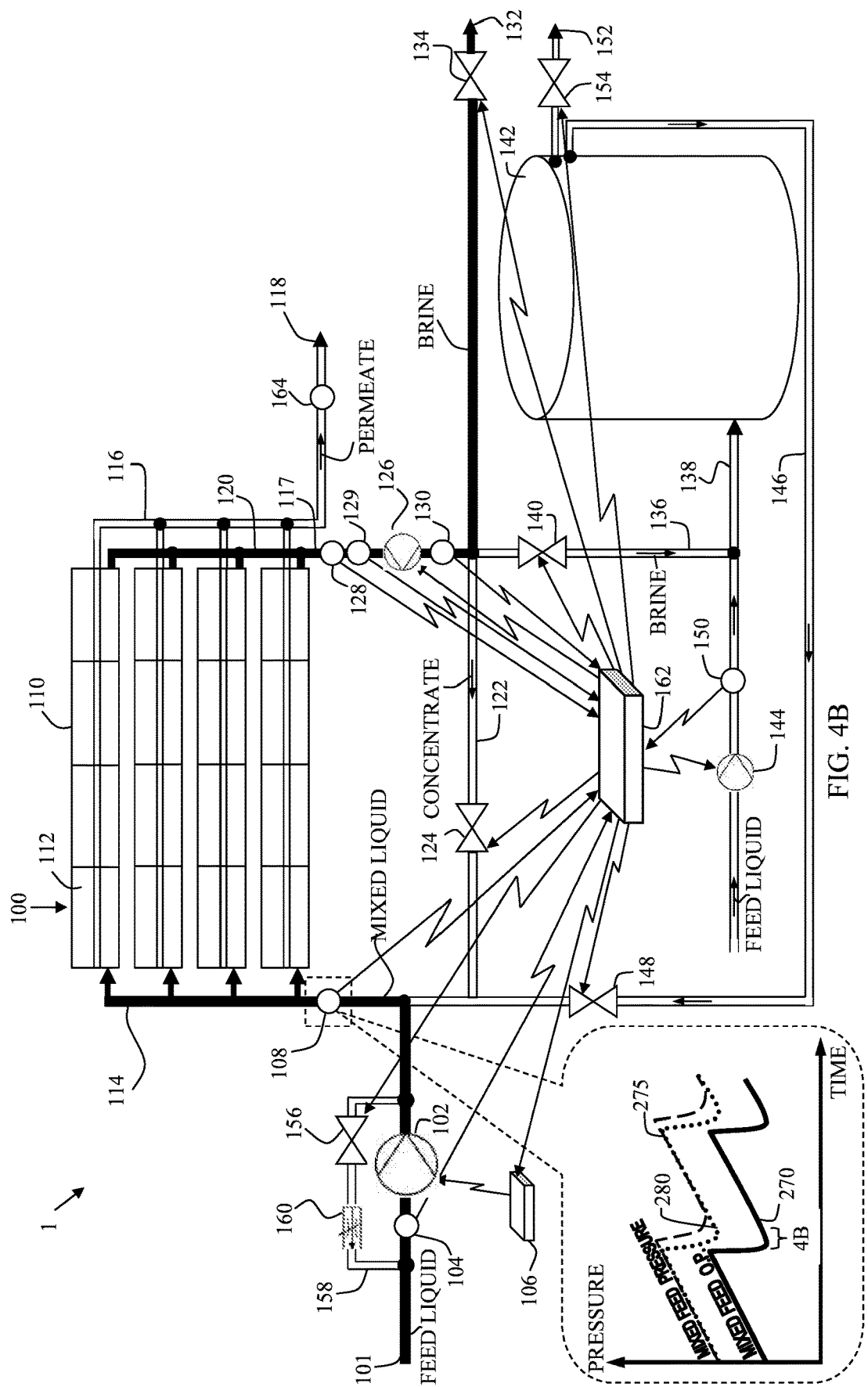
Figure 5:
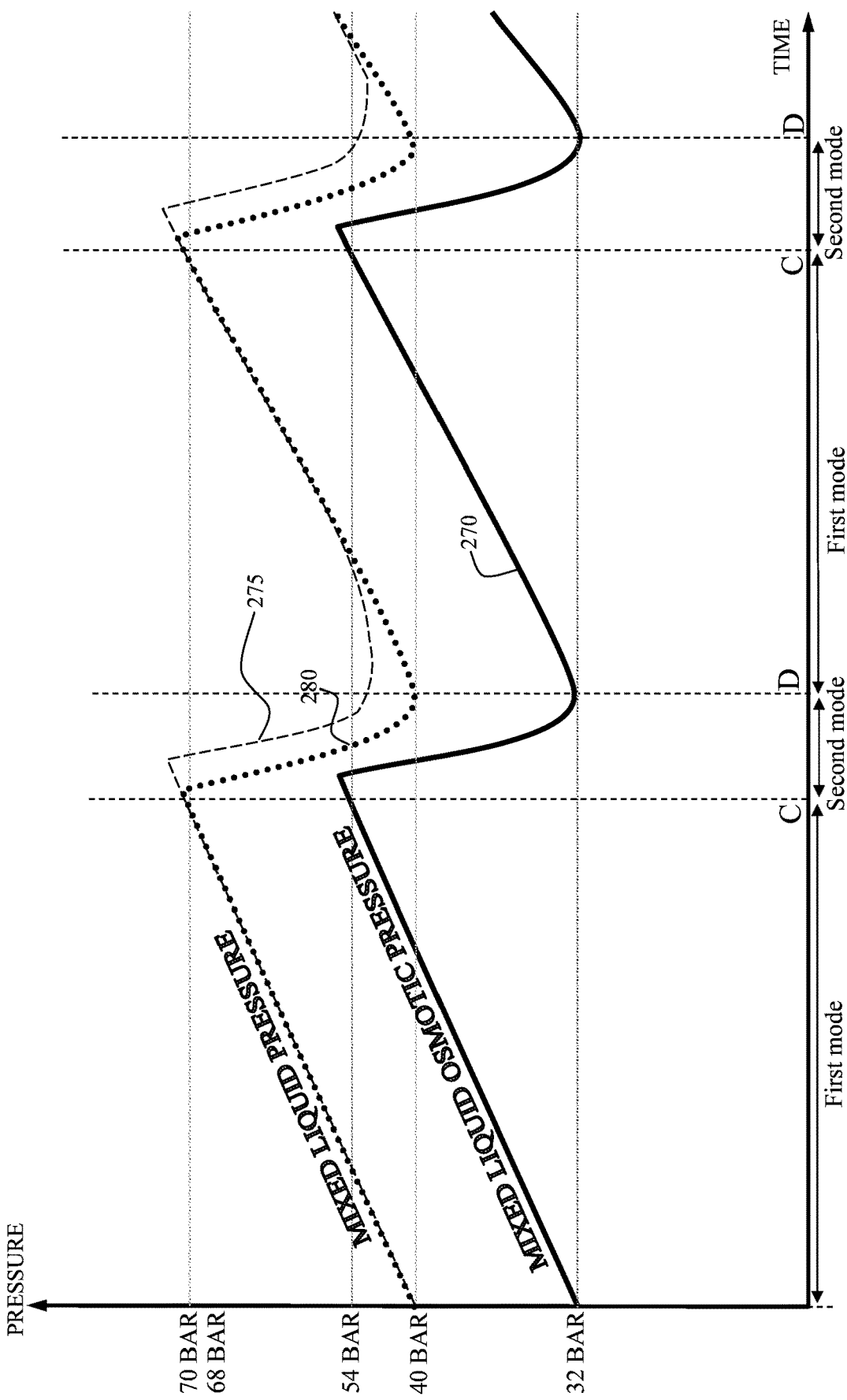
FIG. 5 is a simplified illustration of periodic variations in mixed liquid pressure and mixed liquid osmotic pressure during operation of the system according to the second example of FIGS. 4A, 4B and 4C, with distinction from the prior art.

Reference is now made to FIG. 4B, in which solid black lines show the flow that takes place during the flushing process. According to the present example, the flushing of the brine is performed by instructions of the system controller 162 to close concentrate recirculation control valve 124 and at least partially open the brine valve 134, thus allowing brine to flow via the brine outlet 132 to a location outside of the system 1, thus reducing the pressure of the mixed liquid. The reduced pressure can be above the osmotic pressure of the feed liquid. The brine is all flushed through the brine outlet 132, while the high pressure feed pump 102 continues to pump the feed liquid to the feed side of module 100, as shown in FIG. 5B so as to maintain said predetermined fixed flow rate of the permeate in the second mode.

Reference is now made again to FIG. 5, in order to discuss the graphs shown therein during the second mode of the high pressure pump 102 and the flushing process of the brine.

During the flushing process, the concentrate is not recirculated back to feed manifold 114, thus only feed liquid enters the feed manifold 114 and the mixed osmotic pressure decreases sharply, as shown in the sharp decline in line 270. Moreover, during the second mode of the high pressure pump, the pressure of the feed liquid is sharply reduced, as shown in the sharp decline in line 280.

Line 275 in FIG. 5 illustrates the behavior of the mixed liquid pressure in a prior art system in which the high pressure pump is not operated in two modes, but only in a single mode. As can be observed, the mixed liquid pressure line 275 begins its drop (denoted by the dotted line to the right of dotted line C) only after the mixed liquid osmotic pressure already dropped below a certain threshold, thereby experiencing overshooting. The difference, represented by the area delimited between line 275 and line 280, illustrates the energy benefit of operation at lower pressures for desalination of sea water by the system and method of the presently disclosed subject matter, and thus saving energy and preventing overshooting. In the prior art system, the operational frequency of the high pressure pump is reduced as a result of flushing of the brine, causing reduction of the mixed liquid pressure.

Figure 4C:
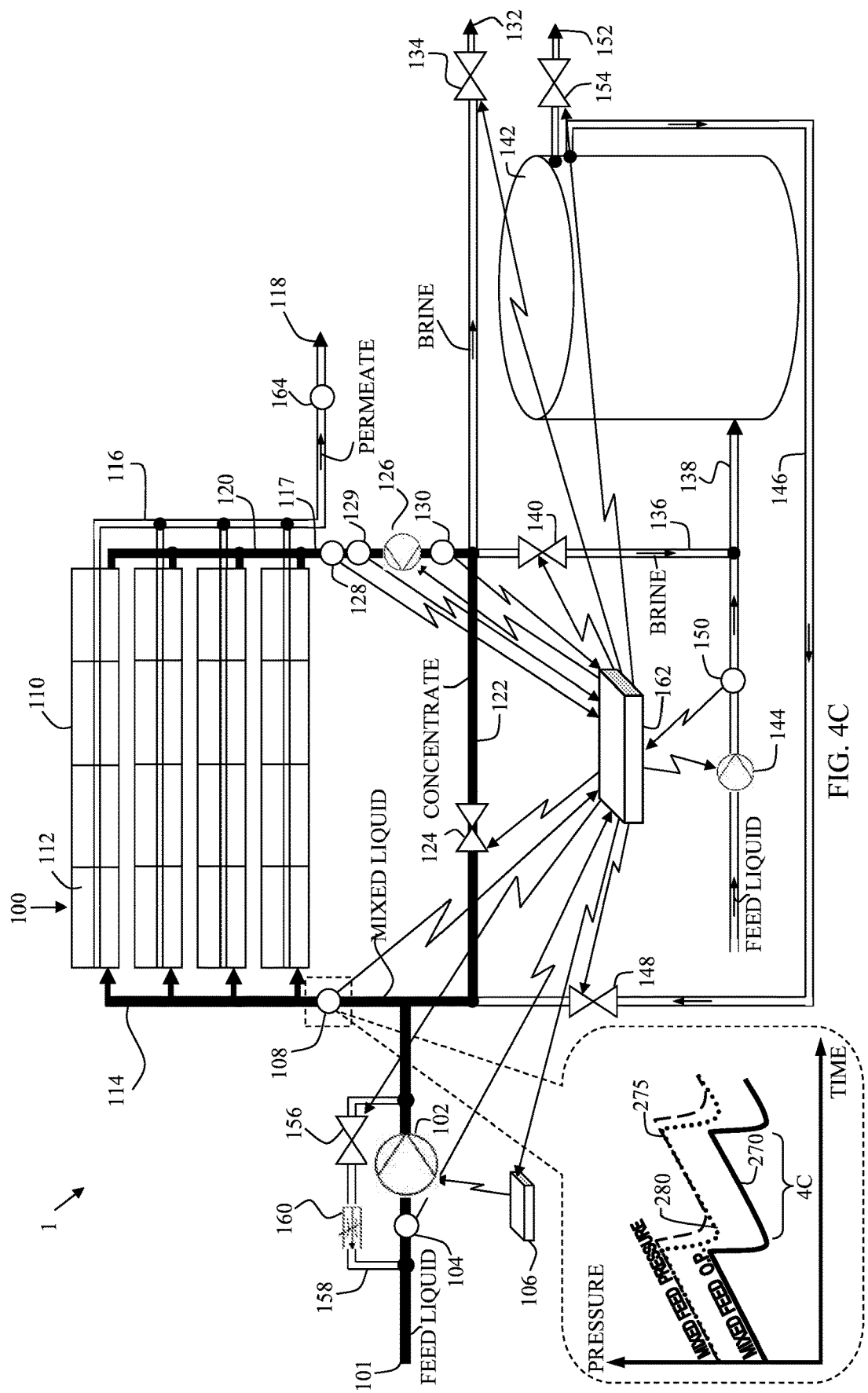

The concentrate flow rate meter 130 measures the cumulative volume of brine flowing from the concentrate manifold 120, and thus measures the cumulative volume of feed liquid entering the feed manifold 114 via the auxiliary feed liquid conduit 146 and the auxiliary feed liquid control valve 148, which replaces the brine in module 100. Therefore, based on the measurements of the concentrate flow rate meter 130 it is known when the complete volume of the brine exit the module. At these points in time, which are represented by dashed vertical lines 'D', the operation of the high pressure pump 102 in the second mode is terminated, and the system controller 162 reverts to controlling operation of the high pressure pump in the first mode. At this point in time, the flushing process of the brine is also terminated. After full replacement of the brine with feed liquid in the module 100, the system controller 162 reopens recirculation control valve 124, and closes the brine valve 134, providing a fluid flow as shown in FIG. 4C, which may be identical to the fluid flow illustrated in FIG. 4A.

It should be indicated that the process of flushing the brine, can also be accompanied with one or more of the following processes performed under control of the system controller 162:
- opening a pressure reducing valve (not shown) downstream of the high pressure pump;
- increasing liquid flow rate output of the circulation pump 126; and
- passing the feed liquid from a downstream of the high pressure pump 102 to an upstream of the high pressure pump 102, thereby lowering the feed liquid pressure at the manifold 114. For this operation, the system controller 162 opens the recycle conduit control valve 156.

It should further be indicated that the third operational parameter can alternatively be obtained by one or more of the following operations:
- measuring conductivity of the concentrate by the concentrate conductivity meter 129;
- measuring pressure of the concentrate by the concentrate pressure meter 128;
- using information regarding accumulation of foulants on the membrane elements 112; and
- using a predetermined time schedule.

Figure 6:
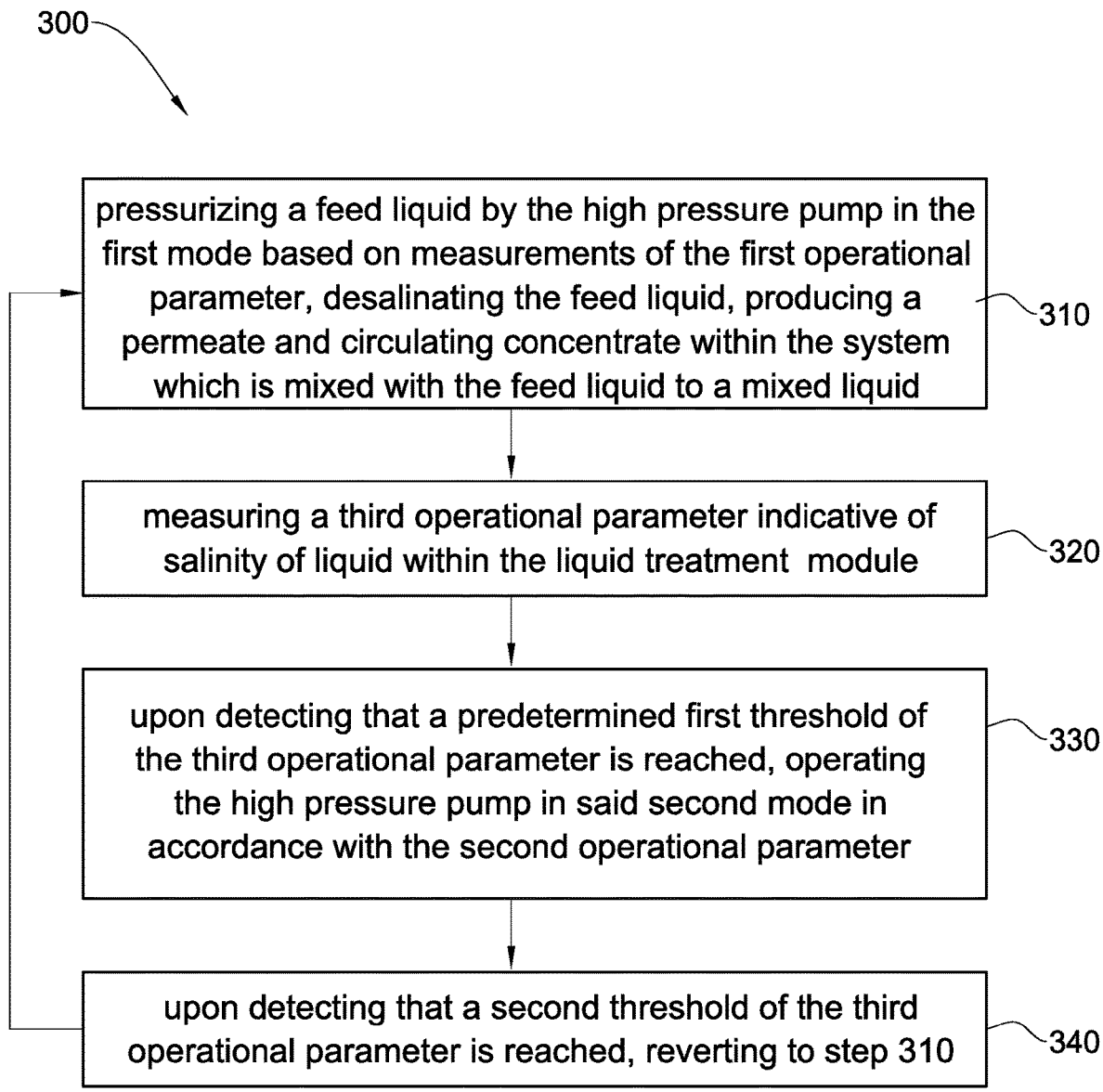
FIG. 6 is a schematic block diagram of a method for operating the system of FIG. 1.

Reference is now made to FIG. 6, in which a block diagram for an example of a method 300 of the presently disclosed subject matter for operating the system 1 is shown. The method 300 show only the main steps which are performed in the system 1, and of course many other particular steps are performed in parallel as well, as detailed above with respect to the examples of FIGS. 2A to 2D and 4A to 4C.

In step 310 the following is performed: pressurizing a feed liquid by the high pressure pump 102 in the first mode based on measurements of the first operational parameter, producing a permeate and circulating a concentrate within the system 1 which is mixed with the feed liquid to a mixed liquid.

In step 320 the following is performed: measuring a third operational parameter indicative of salinity of liquid within said liquid treatment module.

In step 330 the following is performed: upon detecting that a predetermined first threshold of the third operational parameter is reached, operating the high pressure pump 102 in the second mode in accordance with the second operational parameter.

In step 340 the following is performed: upon detecting that a second threshold of the third operational parameter is reached, reverting to step 310.

The invention claimed is:

1. A method of treatment of liquid in a liquid treatment system, wherein the liquid treatment system includes: at least one liquid treatment module including at least one membrane and having a feed liquid inlet at a feed side of said at least one membrane, a permeate outlet at a permeate side of said at least one membrane, and a concentrate outlet at a brine side of said at least one membrane; a high pressure pump operative for pressurizing feed liquid to be received at said feed liquid inlet; and a system controller for controlling operation of the system including providing instructions to operate said high pressure pump in one of at least two operation modes including: a first mode in which the high pressure pump maintains a fixed flow rate of the feed liquid at said feed liquid inlet or of a permeate liquid at said permeate outlet, while energy consumption of said high pressure pump is increased based on variations of a first operational parameter measured in the system and indicative of salinity of liquid within said at least one liquid treatment module, and a second mode in which the high pressure pump maintains a flow rate of the feed liquid at said feed liquid inlet or of a permeate liquid at said permeate outlet, while energy consumption of said high pressure pump is reduced based on a second operational parameter determined so as to reduce energy consumption of the high pressure pump, wherein the feed liquid flows from the feed side of said at least one membrane to the permeate side of said at least one membrane in both the first mode and the second mode; said method being performed under control of said system controller, said method comprising:
- pressurizing feed liquid by said high pressure pump in said first mode;
- circulating a concentrate from said concentrate outlet to said feed liquid inlet;
- providing to said system controller a third operational parameter measured in the system and indicative of salinity of liquid within said liquid treatment module; and
- upon detecting that a predetermined first threshold of said third operational parameter is reached, operating said high pressure pump in said second mode.

2. A method of claim 1, wherein upon detecting that said predetermined first threshold is reached, said method further comprises a step of lowering pressure of a mixed liquid constituted by said feed liquid and said concentrate.

3. A method of claim 2, wherein said step of lowering pressure of said mixed liquid is performed by at least one of the following:
- opening for a predetermined period a brine valve at a brine outlet disposed at said brine side, thereby driving at least some of said concentrate to said brine outlet; or
- equilibrating liquid pressures between said at least one liquid treatment module and inside of a feed liquid tank having a prefilled feed liquid, driving said concentrate from said concentrate outlet to said feed liquid tank and driving said prefilled feed liquid from said feed liquid tank to said liquid treatment module.

4. A method of claim 1, wherein said liquid treatment system further comprises a flow rate meter disposed in proximity to said high pressure pump or at said permeate outlet and in communication with said system controller; and said method further comprises a step of measuring, by said flow rate meter, flow rate of said feed liquid which constitutes said first operational parameter, so that upon decrease of said flow rate, the pressure output and respectively the energy consumption of said high pressure pump is increased and upon increase of said flow rate, the pressure output and respectively the energy consumption of said high pressure pump is decreased, thereby maintaining said fixed flow rate.

5. The method of claim 1, wherein said liquid treatment system further comprises a pump controller in communication with said system controller and said high pressure pump; and wherein said method further comprises:
receiving said first operational parameter in said system controller, and based on the variation of the first operational parameter, generating operational signals to said pump controller so as to maintain said fixed flow rate;
receiving said operational signals in said pump controller and determining based thereon an operational frequency; and
instructing said high pressure pump to operate with said operational frequency, thereby determining the energy consumption of the high pressure pump.

6. The method of claim 1, further comprising upon detecting that a second threshold of said third operational parameter is reached, reverting to said step of pressurizing feed liquid by said high pressure pump in said first mode.

7. The method of claim 1, further comprising obtaining, under control of said system controller, at least one of said first operational parameter and said third operational parameter by at least one of:
measuring conductivity of said concentrate by a conductivity meter;
measuring pressure of said concentrate with or without said feed liquid by a pressure meter;
using information regarding accumulation of foulants on said at least one membrane element; or
using a predetermined time schedule.

8. A liquid treatment system, comprising:
at least one liquid treatment module including at least one membrane and having a feed liquid inlet at a feed side of said at least one membrane, a permeate outlet at a permeate side of said at least one membrane, and a concentrate outlet at a brine side of said at least one membrane;
a high pressure pump operative for pressurizing feed liquid to be received at said feed liquid inlet; and
a system controller configured for controlling operation of the liquid treatment system by:
providing instructions to operate said high pressure pump for pressurizing the feed liquid in a first mode in which the high pressure pump maintains a fixed flow rate of the feed liquid at said feed liquid inlet or of a permeate liquid at said permeate outlet, while energy consumption of said high pressure pump is increased based on variations of a first operational parameter measured in the system and indicative of salinity of liquid within said at least one liquid treatment module, and wherein the feed liquid flows from the feed side of said at least one membrane to the permeate side of said at least one membrane in the first mode;
providing instructions to circulate a concentrate from said concentrate outlet to said feed liquid inlet;
receiving a third operational parameter measured in the system and indicative of salinity of liquid within said liquid treatment module; and
upon detecting that a predetermined first threshold of said third operational parameter is reached, providing instructions to operate said high pressure pump in a second mode in which the high pressure pump maintains a flow rate of the feed liquid or of a permeate liquid at said permeate outlet, while energy consumption of said high pressure pump is reduced based on a second operational parameter determined so as to reduce energy consumption of the high pressure pump, wherein the feed liquid flows from the feed side of said at least one membrane to the permeate side of said at least one membrane in the second mode.

9. The liquid treatment system of claim 8, wherein upon detecting that said predetermined first threshold of said third operational parameter is reached, said system controller is further configured for providing instructions for lowering pressure of a mixed liquid constituted by said feed liquid and said concentrate.

10. The liquid treatment system of claim 9, wherein said system controller is configured for providing the instructions for lowering pressure of the mixed liquid, and providing the instructions to operate said high pressure pump in the second mode, in a substantially simultaneous manner.

11. The liquid treatment system of claim 9, further comprising a brine valve at a brine outlet disposed at said brine side; and wherein said system controller is configured for providing the instructions for lowering pressure of the mixed liquid by opening said brine valve, thereby driving at least some of said concentrate to said brine outlet.

12. The liquid treatment system of claim 8, further comprising a flow rate meter disposed in proximity to said high pressure pump or at said permeate outlet and in communication with said system controller for providing to said system controller measurements of flow rate of said feed liquid which constitutes said first operational parameter, so that upon decrease of said measured flow rate, said system controller provides instructions to increase the pressure output and respectively the energy consumption of said high pressure pump and upon increase of said measured flow rate, said system controller provides instructions to decrease the pressure output and respectively the energy consumption of said high pressure pump, so as to maintain said fixed flow rate.

13. The liquid treatment system of claim 8, further comprising a pump controller in communication with said system controller and said high pressure pump; wherein said system controller is configured for receiving said first operational parameter and based on the variation of the first operational parameter, generating operational signals to said pump controller so as to maintain said fixed flow rate; and wherein said pump controller is configured for receiving said operational signals and determining based thereon an operational frequency, and instructing said high pressure pump to operate with said operational frequency, so as to determine the energy consumption of the high pressure pump.

14. A liquid treatment system, comprising:
at least one liquid treatment module including at least one membrane and having a feed liquid inlet at a feed side of the at least one membrane, a permeate outlet at a permeate side of the at least one membrane, and a concentrate outlet at a brine side of the at least one membrane;
a high pressure pump operative for pressurizing feed liquid to be received at the feed liquid inlet; and
a system controller configured for controlling operation of the liquid treatment system by:
providing instructions to operate the high pressure pump for pressurizing the feed liquid in a first mode in which the high pressure pump maintains a fixed flow rate of the feed liquid or of a permeate liquid at the permeate outlet, while energy consumption of the high pressure pump is increased based on variations in salinity of liquid within said at least one liquid treatment module, wherein the feed liquid flows from the feed side of said at least one membrane to the permeate side of said at least one membrane in the first mode;

providing instructions to circulate a concentrate from said concentrate outlet to said feed liquid inlet;

receiving indication of salinity of liquid within said liquid treatment module; and upon detecting that a predetermined indication of said salinity is reached, providing instructions to operate the high pressure pump in a second mode in which the high pressure pump maintains a flow rate of the feed liquid or of a permeate liquid at the permeate outlet, while energy consumption of the high pressure pump is reduced, wherein the feed liquid flows from the feed side of said at least one membrane to the permeate side of said at least one membrane in the first mode.

15. The liquid treatment system of claim 14, wherein the energy consumption of the high pressure pump in the first mode is increased based on variations of a first operational parameter measured in the system and indicative of the salinity of liquid within the liquid treatment module.

16. The liquid treatment system of claim 15, wherein said first operational parameter is at least one of the following measurable parameters:
flow rate of the feed liquid;
conductivity of the concentrate;
pressure of the concentrate with or without said feed liquid;
information regarding accumulation of foulants on the at least one membrane element; or
a predetermined time schedule.

17. The liquid treatment system of claim 14, wherein said energy consumption of the high pressure pump in the second mode is reduced based on a second operational parameter.

18. The liquid treatment system of claim 17, wherein said second operational parameter is at least one of the following:
a predetermined value of the operational frequency;
a predetermined value of flow rate which is lower than the fixed flow rate of the feed liquid; or
a predetermined value of flow rate which is lower than the fixed flow rate of the permeate liquid.

19. The liquid treatment system of claim 14, wherein said indication of salinity provided to the system controller is provided by measuring a third operational parameter indicative of the salinity of liquid within said liquid treatment module.

20. The liquid treatment system of claim 19, wherein said third operational parameter is at least one of the following measurable parameters:
flow rate of the feed liquid;
conductivity of the concentrate;
pressure of the concentrate with or without said feed liquid;
information regarding accumulation of foulants on the at least one membrane element; or
a predetermined time schedule.

* * * * *